United States Patent
McCoy et al.

[15] 3,663,298
[45] May 16, 1972

[54] ROTATABLE ELECTRODE STRUCTURE WITH CONDUCTIVE PARTICLE BED

[72] Inventors: Lowell R. McCoy, Woodland Hills; Laszlo A. Heredy, Canoga Park, both of Calif.

[73] Assignee: North American Rockwell Corporation

[22] Filed: Mar. 3, 1970

[21] Appl. No.: 16,203

[52] U.S. Cl. .................................. 136/31, 136/6, 136/83, 136/86 A, 204/213, 204/280, 204/283, 204/290
[51] Int. Cl. .................................. H01m 43/02, B01k 3/02
[58] Field of Search .................. 204/283, 284, 280, 249, 213, 204/10, 80; 136/86 D, 6, 31, 83, 86 A; 204/212–213

[56] References Cited

UNITED STATES PATENTS

| | | | |
|---|---|---|---|
| 521,991 | 6/1894 | Sachs et al. | 204/10 |
| 3,344,817 | 10/1967 | Connard | 148/12.1 |
| 3,199,999 | 8/1965 | Greening, Jr. et al. | 204/213 X |
| 2,503,863 | 4/1950 | Bart | 204/283 X |
| 3,005,763 | 10/1961 | Kollsman | 204/213 X |

FOREIGN PATENTS OR APPLICATIONS 6,707,208   11/1967   Netherlands ...........................204/280

Primary Examiner—John H. Mack
Assistant Examiner—D. R. Valentine
Attorney—L. Lee Humphries, Thomas S. MacDonald and Henry Kolin

[57] ABSTRACT

An electrode structure for use with an electrolyte wherein an electrically conductive flowing particle bed stream within a compartment of the electrode structure establishes a plurality of electrochemical reaction sites at the interface of the particles and of the electrolyte.

The flowing particle bed electrode structure finds a preferred application as an electrode in an electrically regenerable system, particularly as a rotatable zinc electrode in zinc-nickel oxide and zinc-air secondary cells.

9 Claims, 14 Drawing Figures

Patented May 16, 1972

INVENTORS
LOWELL R. McCOY
LASZLO A. HEREDY
BY
Henry Kolin
ATTORNEY

INVENTORS
LOWELL R. McCOY
LASZLO A. HEREDY
BY Henry Kolin
ATTORNEY

Patented May 16, 1972

INVENTORS
LOWELL R. McCOY
LASZLO A. HEREDY

BY Henry Kolin
ATTORNEY

INVENTORS
LOWELL R. M COY
LASZLO A. HEREDY

BY Henry Kolin
ATTORNEY

Patented May 16, 1972
3,663,298
5 Sheets-Sheet 5
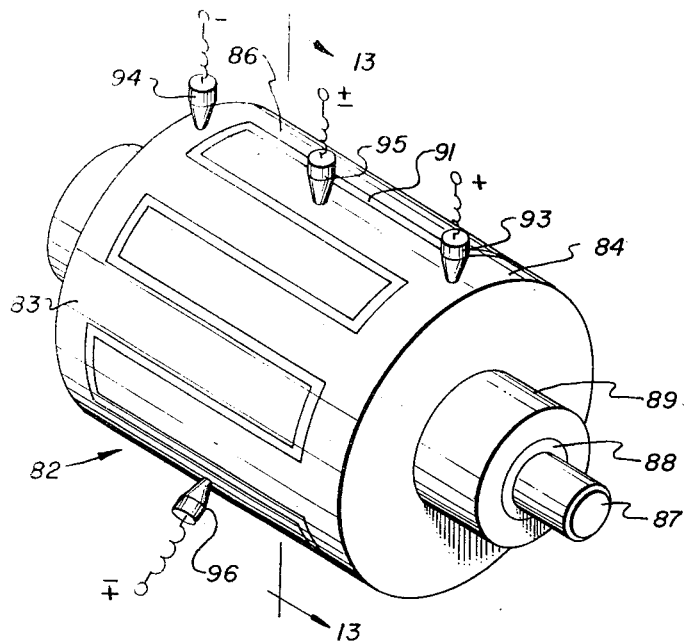
FIG. 12
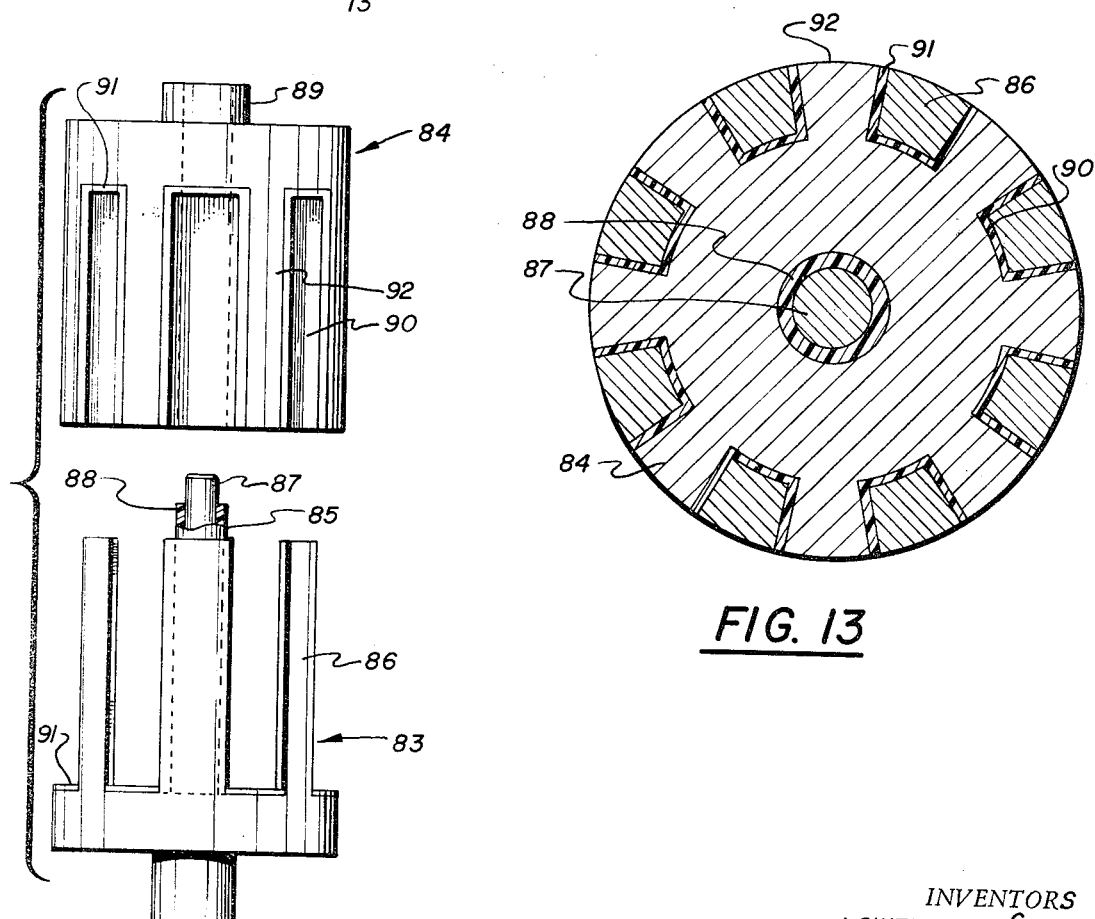
FIG. 13
FIG. 14
INVENTORS
LOWELL R. M<sup>c</sup>COY
LASZLO A. HEREDY
BY
Henry Kolin
ATTORNEY

3,663,298

ROTATABLE ELECTRODE STRUCTURE WITH CONDUCTIVE PARTICLE BED

BACKGROUND OF THE INVENTION

This invention relates to an electrode structure having an electrically conductive flowing particle bed stream of particulate bodies for establishing a plurality of electrochemical reaction sites at the interface of the particulate bodies and the electrolyte. More particularly, it relates to a rotatable zinc electrode structure and to zinc secondary cells provided with such electrodes.

The present flowing particle bed electrode structure, by providing a plurality of electrochemical reaction sites at its interface with an electrolyte, finds utility in many varied applications. One of the most important of these is as a zinc anode in an electrically regenerable, high energy density zinc-nickel oxide or zinc-air cell because of the capability of this unique zinc electrode to undergo repeated charge and discharge cycles at high current levels, heretofore unattainable in a zinc secondary battery.

The unique position of zinc as a negative electrode for use in electric cells and batteries has long been recognized because zinc is cheap, abundant, has a low rate of self discharge in alkaline electrolytes, and has a high energy density when used in combination with common counterelectrodes. For these reasons, it is used extensively in primary batteries. It is also attractive for use in secondary batteries as it provides the highest energy density of the metals that can be electrodeposited from an inexpensive, highly conductive aqueous electrolyte at ambient temperatures. However, the use of zinc electrodes in secondary batteries has been severely limited by their failure to withstand repeated cycling at high charge and discharge rates and by the limited depth of discharge that can be achieved without an irreversible loss of capacity. In particular, repeated recharge of these electrodes leads to undesirable changes in the electrode structure with a frequent mode of failure consisting of shorting due to dendritic growth of zinc through the plate separators.

Many attempts have been made to overcome these problems encountered in the attempted use of zinc electrodes in secondary batteries. Some of these approaches have involved utilizing a porous electrode structure, circulating the electrolyte, and using rotating planar electrodes. See, for example, U. S. Pat. Nos. 3,359,136; 3,275,475; and 3,440,098 in which are described some of the problems encountered in using an electrochemically reversible electrode, particularly a zinc/zinc oxide electrode subjected to charge-discharge cycling. In U. S. Pat. No. 3,440,098, it is proposed to overcome the development of dendritic deposits, which tend to bridge the interelectrode gap between the reversible electrode and the counterelectrode, by using a rotating wiper member for sweeping the face of the active electrode.

While the foregoing techniques may provide partial solutions for one or another of the various problems encountered in devising high performance electrodes suitable for use in secondary batteries, to date they have been unable to provide secondary batteries capable of extended cycling at high charge-discharge rates. The flowing particle bed electrode structure provided herein, particularly when utilized as the zinc anode in a rechargeable zinc-air or zinc-nickel oxide secondary cell or battery, eliminates dendrite formation, provides for uniform zinc deposition, and is capable of attaining a long cycle life at high current densities.

SUMMARY OF THE INVENTION

It is an object of the present invention to provide a unique electrode structure capable of providing a plurality of electrochemical reaction sites at an electrode-electrolyte interface. It is a further object of the invention to provide a zinc anode for use in a rechargeable zinc-counterelectrode cell which provides a long cycle life at high current densities. It is still a further object to provide improved zinc-nickel oxide and zinc-air secondary batteries.

In accordance with this invention, an electrode structure is provided for use with an electrolyte wherein a compartment permeable to the electrolyte contains an electrically conductive bed of particulate bodies partially filling this compartment. This particle bed is retained in the compartment and makes electrical contact with a current collector. This conductive bed is then placed in motion to provide an electrically conductive flowing particle bed stream within the compartment. By continually presenting new surfaces in contact with the electrolyte, a plurality of electrochemical reaction sites are established at the interface of the particulate bodies and the electrolyte. At the same time, the movement of the particles in the electrolyte facilitates transport of the dissolved reactants to, and reaction products from, these electrochemical reaction sites.

In accordance with a further feature of this invention there are provided zinc-counterelectrode secondary batteries, particularly zinc-nickel oxide and zinc-air batteries, wherein the zinc electrode comprises a rotatable electrode structure providing an electrically conductive flowing particle bed stream within the electrode structure in accordance with this invention. The counterelectrode may be fixed or rotatable together with the rotating zinc electrode. Also, where the counterelectrode structure is rotatable, it may optionally contain an electrically conductive bed of particulate bodies for establishing a plurality of electrochemical reaction sites at the interface of these particulate bodies and the electrolyte.

In the preferred aspects of practicing the invention, the electrode structure is designed to provide a large conductive surface area within a given volume and a high degree of agitation at the electrolyte-electrode surface interface. This is achieved by using an electrically conductive flowing particle bed containing many individual essentially spherical electrically conductive particles moving freely within the constraints of a rotating compartment whose axial dimension is small relative to the circumscribed outer diameter. The electrode compartment preferably consists of a shallow cylindrical container made of an insulating material. This compartment includes a first means for retaining the particle bed within the compartment, which at the same time is permeable to the movement of ions, such as by the flow of electrolyte therethrough. Suitably, this retaining or separator means consists of a plastic screen, such as a tetrafluoroethylene polymer screen, which is readily permeable to the flow of electrolyte, and constitutes a surface of the compartment which would be in a facing relationship to an opposing counterelectrode in an electric cell configuration.

A second means, such as a rotatable shaft, is provided for moving the bed of particulate bodies so as to provide an electrically conductive flowing particle bed stream within the compartment. Suitably, the rotatable electrode structure, which contains one or more particle bed compartments, is axially secured to a rotatable shaft. The bed of particulate bodies is made to flow as a particle bed stream by providing a suitable drive means, such as a directly coupled low-speed motor, for engaging the shaft and rotating it at a predetermined speed. This speed is preselected so as to maintain a controlled degree of agitation or tumbling of the particulate bodies so as to provide a coherent conductive flowing particle bed stream within the compartment.

A third means is provided in contact with the particle bed for collecting current therefrom. This current-collecting means may constitute a conductive second face of the shallow cylindrical container and make contact with the entire surface of the particle bed. Or this current-collecting face may be electrically insulated over most of its central portion from the particle bed; current collection is then obtained in that electrical contact is then made only with the peripheral or outer edge of the rotating particle bed so as to provide edge collection of current from the rotating electrode structure.

BRIEF DESCRIPTION OF THE DRAWINGS

FIG. 12 is a perspective view of a rotating assembly showing a current tap-off arrangement for obtaining both alternating current and direct current from the same cell structure.

FIG. 13 is a cross-sectional view taken along the lines 13—13 of FIG. 12.

FIG. 14 is a plan view of the rotating assembly of FIG. 12 in disassembled form.

DESCRIPTION OF THE PREFERRED EMBODIMENTS

Figure 1:
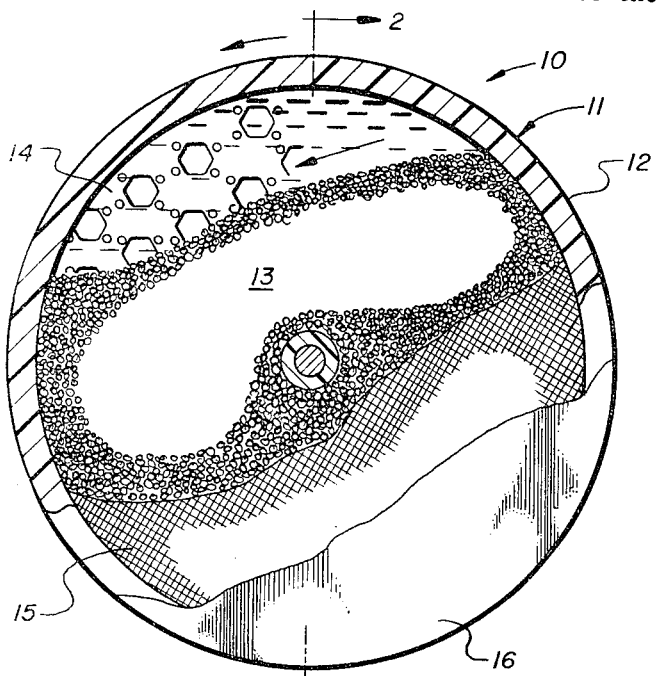
FIG. 1 is an elevational view, partly in section, of a cell utilizing the electrode structure of this invention.

In its broadest aspects, the electrode structure of this invention may be utilized in many electrochemical systems for a wide variety of electrochemical applications because of the increase provided by this electrode structure in the total rate at which an electrochemical process takes place. This increase in rate is obtained by providing an electrically conductive flowing particle bed stream within a rotating electrode structure so as to establish a plurality of electrochemical reaction sites at the interface of the particulate bodies and of the electrolyte.

The total rate at which an electrochemical process takes place at an electrode surface is the product of the electrode surface area and the rate per unit area (current density). Utilization of the conductive flowing particle bed stream in the electrode structure provides an improvement in both factors so as to give an increased total rate for the electrochemical process for a cell of given physical configuration. Thus, by providing many small particles, preferably ranging in size from 0.1 to 10 mm. in diameter depending upon the particular application, the total surface area enclosed within a given volume is considerably increased. At the same time, the freely flowing motion of this particle bed maintains a relatively rapid movement of the electrolyte solution relative to the electrode surface. Thus, for a given electrode surface area, this movement increases the rate at which reactants may be brought to the surface or reaction products removed therefrom, thereby permitting use of a higher current density.

The electrode structure utilizing the flowing particle bed stream has many varied technical applications. For example, it is useful as a cathode, as an anode, or both in electrochemical cells or batteries, in aqueous or nonaqueous solvents, for the electrowinning of metals, and in the electrochemical demineralization of brackish or saline waters. In some of these applications, e.g., as a zinc anode in a zinc-counterelectrode secondary cell, there will be changes in volume size of the particle bed as deposition occurs on the surface of the particles and dissolution therefrom. In other applications there will be no change in volume of the particle bed during cell reaction.

When the rotating electrode structure is used in secondary cells, a wide variety of electrodepositable metals, e.g., Zn, Cd, Sn, Pb, may be employed as negative electrodes. During the discharge cycle of the cell, these metals of the negative electrode are oxidized. On recharging the cell, these metals are redeposited on the negative electrode. While generally the flowing particle bed stream will constitute the negative electrode or anode structure of the cell or battery, it may also in certain applications constitute only the cathode structure; or both the cell or battery electrode and counterelectrode structures may consist of flowing particle bed streams. As used herein, the term battery generally designates an assembly of substantially identical units or cells, but it may conveniently be used to designate only a single unit. Similarly, the term counterelectrode merely refers to an opposing electrode, whether utilized as an anode or cathode, and whether or not electrochemically reversible.

The use of such a rotating particle bed electrode structure in the secondary cell system offers the further important advantage that with the repeated cycles of charge and discharge the flowing particle bed stream prevents possible dendritic formation and hence allows repeated cycling. This is of particular importance where the rotating particle bed is utilized as a zinc electrode in a secondary cell because of the severe problem of dendritic growth which ordinarily characterizes conventionally used zinc electrodes in secondary cells. At the same time, because of the continuing contact of the particles with one another, and their relative motion, a smoothing or compacting of the deposited material occurs with the formation of a more uniform coating.

Because of its ability to provide repeated cycles of charge and discharge which would be required in secondary cell systems, the electrode of this invention finds particular utility as a zinc electrode in a secondary cell; such an electrode may be employed with a wide variety of counterelectrodes, which may be chemically inert or be composed of electrochemically reversible materials. When the zinc electrode is used as an anode (discharge cycle) in a secondary cell, three cathodic materials are of particular interest for use therewith as counterelectrodes, namely, silver oxide, nickel oxide, and oxygen (or air).

The cell reaction for each of the foregoing systems can be written in idealized form as follows:

1 $a$. $Ag_2O + Zn + H_2O \rightleftarrows 2Ag + Zn(OH)_2$
1 $b$. $AgO + Zn + H_2O \rightleftarrows Ag + Zn(OH)_2$
2. $2NiOOH + Zn + 2H_2O \rightleftarrows 2 Ni(OH)_2 + Zn(OH)_2$
3. $1/2O_2$ (air) $+ Zn + H_2O \rightleftarrows Zn(OH)_2$

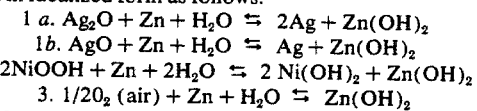

The foregoing secondary battery systems are well known and each offers certain advantages and disadvantages under conditions of repeated cycling in terms of loss of active material, chemical irreversibility, obtainable energy density, cost, and reliability. Use of the rotating particle bed electrode for the zinc electrode will provide an improvement for each of these secondary cell systems, particularly with respect to improved cycle life under conditions of high current charge and discharge.

Thus, the flowing particle bed stream electrode finds particular utility for use as a zinc electrode, particularly as a zinc anode in an electrically regenerable zinc-nickel oxide or zinc-air cell because of its ability to provide a unique zinc electrode capable of repeated charge and discharge cycles, heretofore not realizable For purposes of illustration then, because of its commercial importance, the invention will be particularly described in its various preferred embodiments with reference to such an improved zinc electrode, and to secondary cells and batteries of the zinc-nickel oxide and zinc-air systems, although clearly not limited thereto.

Referring to FIG. 1, an electric cell 10 is shown, illustratively, a zinc-nickel oxide secondary cell, wherein a rotatable electrode 11 comprises a container 12 in which a particle bed 13 is contained. Container 12 is preferably a flat disc of circular cross section, although polygonal shapes may be readily utilized. Particle bed 13 is confined within container 12 by two opposing faces of the container, namely, a conductive perforated surface 14 and an electrolyte-permeable porous insulated separator 15.

Surface 14 serves as a current collector and provides electrical contact with particle bed 13. The current collector surface 14 may be constructed of mesh or screen or other perforated surface provided adequate current conduction with tolerable power loss is obtained. For many applications, it is preferred to have the current collector surface in the form of such a metallic screen rather than as a solid plate. This provides better mechanical adherence of metal which is deposited on the current collector surface so that there is less likelihood of spalling of such deposited metal from the underlying conductive surface.

Figure 2:
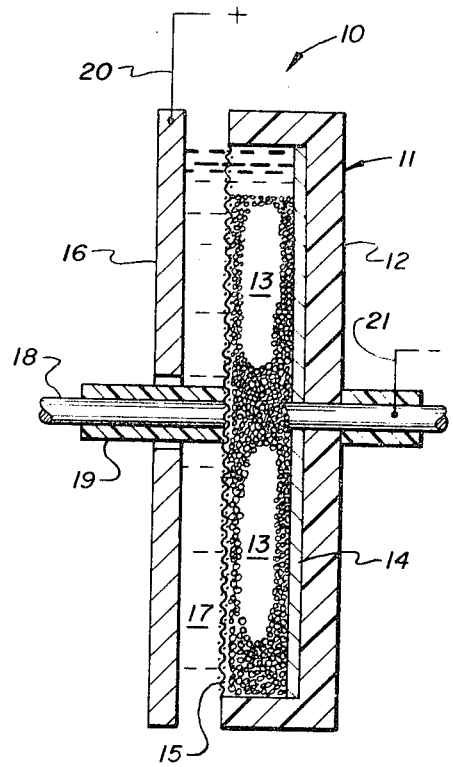
FIG. 2 is a cross-sectional view taken along the lines 2—2 of FIG. 1.

The insulated separator 15 maintains the particles within container 12 and therefore will have openings smaller than those of the particles used and should be of sufficient mechanical strength. Suitably such a separator may consist of a porous plastic sheet or screen resistant to chemical attack by the electrolyte. In some instances it may be desirable that the pore size of separator 15 be sufficiently small so as to prevent ready mixing of products generated at a counterelectrode 16, shown in FIG. 2, representing a cross sectional view taken along the lines 2—2 of FIG. 1, similar numerals being used to represent corresponding parts.

To improve the electrical efficiency of cell 10, electrode 11 is shaped so as to permit close placement of counterelectrode 16 in relation to facing separator 15, thereby minimizing resistance power losses in an electrolyte 17 which provides for transport of charged ionic particles between electrode 11 and counterelectrode 16 during the charge and discharge cycles. Since the efficiency of the electrochemical system is dependent upon electrode 11 providing maximum exposed surface area in close proximity to counterelectrode 16, it is desirable that the circumscribed outer diameter of container 12 be large compared to the axial dimension of rotating electrode 11. A ratio greater than 10:1 is maintained but this may be varied within wide limits, preferably from 20:1 to 200:1 depending upon the particular application involved. Container 12 is suitably insulated; conveniently this is obtained by constructing container 12 of a nonconductive material, such as polystyrene, which is resistant to an alkaline electrolyte. Specific materials utilized will be determined by the nature of the electrolyte, and, provided a nonconductive surface is in contact with the electrolyte, would not affect the principles of the present invention. For example, a metalized container coated with an anodized insulating layer may be used for certain applications, although a lightweight plastic container of suitable strength will be generally preferred.

Figure 3:
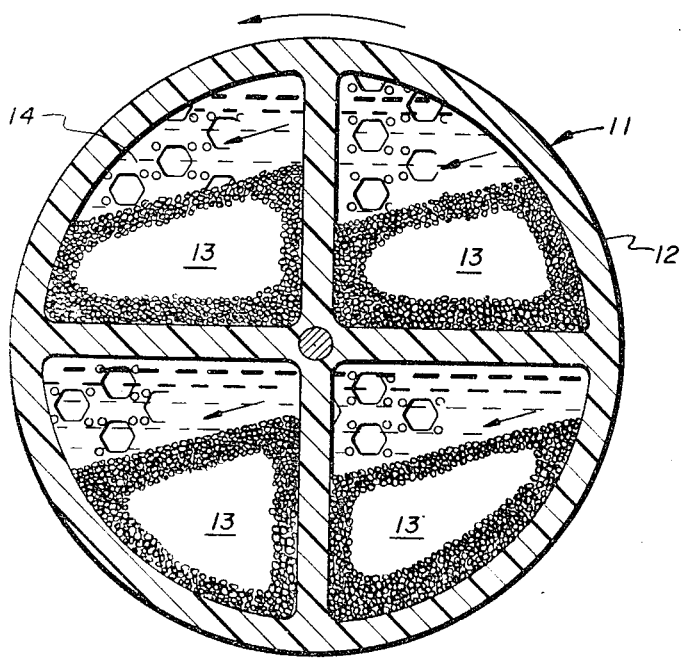
FIG. 3 is another embodiment, shown in section, of the electrode structure of FIG. 1, modified to be multicompartmented.

The particles constituting the particle bed 13 only partially fill container 12 so that there is free movement of the particles within the container to form the flowing particle bed. Also, for most applications, provision must be made for increase in the weight and volume of the particulate bodies by deposition of metal thereon during the charge cycle. Baffles or ribs may be incorporated within the rotating structure to assist in maintaining free movement of the particles within the container. In some instances these baffles may serve to divide the container into several compartments, which provides certain operating advantages. In FIG. 3 is shown an electrode structure otherwise similar to electrode 11 illustrated in FIG. 1 but divided into four compartments, each partially filled with particle beds 13.

Where electrode 11 is part of a secondary cell having repeated charge and discharge cycles, such as a zinc-nickel oxide cell, the flowing particle bed thereof constitutes, for practical purposes, an integral part of the electrode structure through its life. The moving mass of particles in the rotating electrode is deliberately chosen to insure large surface area and maximum mobility. For minimum power loss and greater freedom of motion, the particles should, for most applications, be essentially spherical in shape although some departures from sphericity offer no significant detriment to the effective operation of the rotating electrode. The effect of particle size upon the total surface area enclosed within a given volume can be illustrated by the following (assuming 60 percent density of the mass):

| Diameter of Sphere (mm) | Surface Area ($cm^2/cm^3$ of vol.) |
|---|---|
| 1.00 | 37 |
| 0.10 | 365 |
| 0.01 | 3650 |

It is noted that the total real surface area of the spheres increases linearly as the diameter decreases. Assuming that the axial inside dimension of the electrode is 1 cm, the total real area would be increased by a factor of about 36 over that of a flat disc if 1.00-mm. spheres were used. It is of course obvious that the use of still smaller spheres will assure a greater advantage in terms of area.

It will of course be apparent that if the free and random motion of the particles required for operability of the electrode structure is to be achieved, it will not be possible to fill the container completely with particles. In practice, somewhere between one-fourth and seven-eighths of the container will be filled. It is of course desirable in order to achieve maximum power and energy that the container be substantially filled consistent with permitting free and random motion of the particles. For most operations, not more than three-fourths of the volume of the container will be utilized. Thus a corresponding reduction in area attributed to the surface of the particles shown above will be made.

It will also be noted that the advantages in area cannot be indefinitely extended by unlimited reduction in the particle diameter. For a given electrochemical system, optimum particle size may be readily determined in accordance with the principles of this invention. Practically, a lower limit exists as to the minimum particle size which can be conveniently contained by the separator. Thus a diameter below 0.1 mm. would present difficulties on this score. Also, there is need to maintain adequate electrical contact between the individual particles themselves and the current collector. It is preferred that this contact be essentially continuous between the greater portion of the particles, although the points of contact will be constantly changing in position. Thus, if the particle size becomes too small, the particles will become fluidized in the moving electrolyte and a greater percentage of the particles will be in intermittent contact, thereby reducing the electrochemical effectiveness of the mass. The exact diameter at which this will occur will of course depend upon the speed of revolution of the rotating electrode and the relative densities of the particles and the electrolyte. Thus it is not generally considered that particles having a diameter of less than 0.1 mm. would ordinarily be utilized, and for many applications a particle diameter of 0.5 mm. will constitute a practical minimum. The maximum size of the particles is effectively set by the largest size capable of falling freely within the inside axial dimension of the container. Thus, where very large structures are contemplated, comparatively large spheres will be used. To facilitate uniform free flow of the particle bed, the maximum diameter of the particles used will ordinarily be less than one half of the axial distance, or it may approach this inner axial length. Since the size of the particles will change as the metal is deposited on the particulate bodies during the charge cycle, a smaller initial volume of particles must be present in the cell compartment at the beginning of electrodeposition to allow for a volume change in the course of such electrodeposition. The total quantity of electrodeposited metal capable of being stored in this manner will be determined by the fact that the total volume of the particles cannot be increased beyond some fraction of the volume of the container if the particles are to continue to move freely within the space to constitute an electrically conductive flowing particle bed. Similarly, on discharging the electrodeposited metal to release energy, the volume of the particles cannot be diminished below some fraction of the volume of the rotating container if practical amounts of power are to be drawn.

In addition to the foregoing consideration determining the lower limits of particle size, another factor is involved. Should a particle become so diminished in size as to permit it to become immobilized in a crevice near the separator, deposition of metal upon recharging will cause dendritic growths to form on this particle, which would then penetrate the separator and short the cell. Thus although the greater part of the particles would be moving freely, several immobilized particles could result in shorting of the cell and defeat the purpose of the rotating electrode. It should be noted that minor shorting will not destroy the operability of the rotating electrode as dendrite formation will usually be broken by the motion of the flowing particle bed and the rotation of the electrode, thereby terminating the short.

To obtain careful control of the particle size involved, it is generally desirable to deposit the active metal on a conductive particle which cannot be consumed in the subsequent discharge process. Such conductive particles will serve as "-seed" particles which grow during electrolysis but remain as an irreducible minimum in discharge. The size of the seed particles will of course depend on the particular requirements for a given process relating to electrolyte density, rotational speed adequate for providing desired agitation, and electrode construction such as the size of the openings in the insulated separator. It should also be noted that while the particles are provided with a conductive surface, they need not be conductive throughout. Thus a metallized plastic or ceramic sphere may be used provided the metal surface provides adequate electrical conductivity and is sufficiently electropositive to the metal being deposited to avoid dissolution of the coating on discharge. For certain applications, the use of such particles may be desirable because of weight-saving considerations.

The rotational speed of electrode 11 is another important operational parameter. Again referring to FIGS. 1 and 2, electrode 11 is suitably attached to a conductive shaft 18 which is electrically insulated from counterelectrode 16 by being encased in an insulating coaxial cylinder 19. Upon rotation of shaft 18, electrode 11 will rotate therewith, thereby providing a conductive flowing particle bed. For certain applications, for example, in series-connected cells, counterelectrode 16 may also be made rotatable with electrode 11 by being affixed to shaft 18. As illustrated in FIG. 2, counterelectrode 16 is stationary and has a current lead 20 directly attached thereto. A current lead 21 of opposite polarity is conductively attached to conductive shaft 18. It will of course be apparent that many varied methods are known and may be utilized whereby the current leads make electrical contact with the electrochemical system. Thus, for providing electrical contact with a rotatable electrode, a type of brush contact or other suitable connection is conveniently utilized as a current lead.

The rotational speed of the rotatable electrode will be determined by various factors such as the conductive bed particle size, the weight and volume of these particulate bodies in the container, the number and type of compartments present in the container, and the overall dimensions of the container. The speed must be selected and maintained so as to provide an electrically conductive flowing particle bed. Thus, at excessive speeds, the particles will be held by centrifugal forces to the periphery of the container, and free and random motion of the particles will not be achieved. Conversely, at too low a speed the desired agitation will not be attained. A generally useful range will vary from about 5 to 50 revolutions per minute, although this of course may be considerably varied depending upon the interrelationship of some of the determining factors above mentioned.

The design of the collector surface 14 is also important. The areas of the collector plate adjoining any nonconducting portion such as the outer periphery of the container must be shielded in such a manner as to reduce the local current density to as low a value as possible. This prevents the formation and propagation of zinc deposits of dendrites which would otherwise result from high current densities in such areas. Portions of such deposits could be mechanically broken from the collector and may then lodge and become immobilized within the container, then serving as a source of further growths of electrodeposited zinc which penetrate the separator and cause shorts. Masking the outer rim and hub portions of the rotating electrode with suitable insulating materials, such as rubber or plastic, has been found effective in reducing the local current density to an acceptable level. Also, the manner of current collection may be varied, depending upon the electrode construction. Thus for certain applications, edge or peripheral collection of current may be utilized instead of current collection over the entire surface of the current collector.

The collector plate 14 should also be constructed or surfaced with a metal capable of receiving an adherent plate of the metal to be electrodeposited. For example, the deposition of zinc upon nickel generally produces nonadherent deposits if the nickel has not been subjected to anodic treatment prior to such deposition. These nonadherent deposits may flake off or blister from the nickel causing shorting. Thus an underlying layer of cadmium may be used as a substrate on which zinc is deposited to improve adherence of the zinc. In addition, the current collector may be in perforated form, both to improve the adherence of the deposited metal and to provide a saving in weight.

Figure 5:
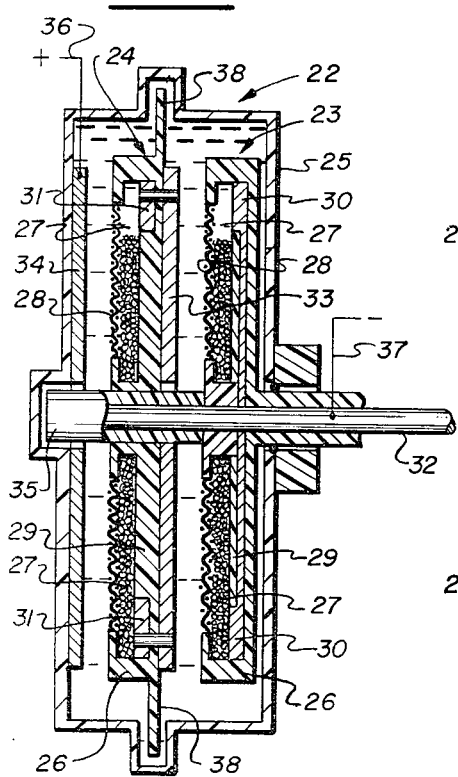
FIG. 5 is a cross-sectional view taken along the lines 5—5 of FIG. 4.
Figure 4:
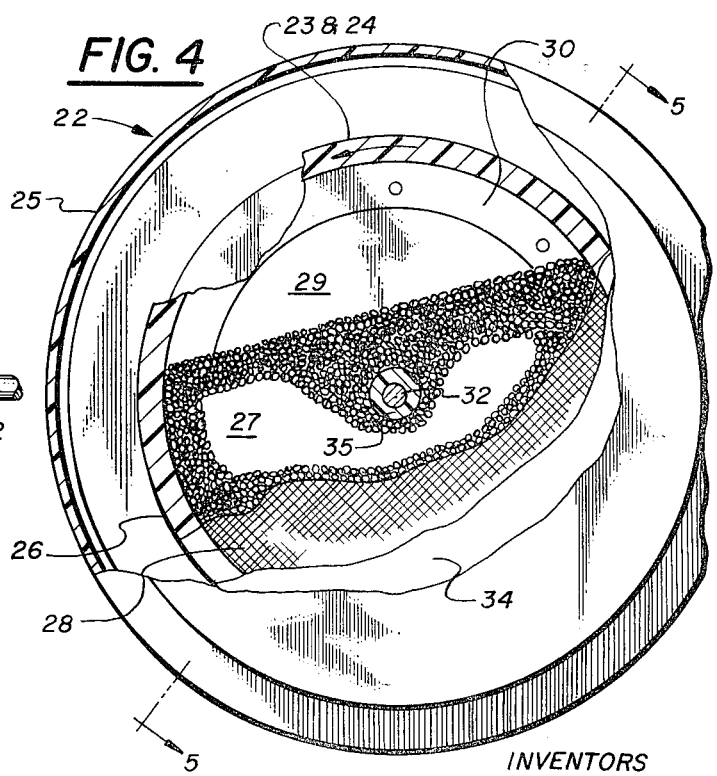
FIG. 4 is an elevational view, partly in section, of a cell utilizing a bipolar single-faced electrode structure.

In FIG. 4 is shown a view of a battery 22 utilizing a plurality of the electrode structures of this invention as bipolar series-connected electrodes. FIG. 5 represents a cross-sectional view taken along the lines 5—5 of FIG. 4. Referring to FIGS. 4 and 5, the battery 22 consists of a plurality of rotating electrodes 23 and 24 enclosed in an insulated cell of battery casing 25. While only two electrodes have been shown for purposes of illustration, many such series-connected bipolar electrodes may be included within the battery casing, with electrical lead connections being made only to the outermost anodic electrode and cathodic counterelectrode. As illustrated, each of electrodes 23 and 24 consists of an insulated container 26 in which a conductive particle bed 27 is confined within a single cell compartment by a porous insulated separator 28 and an opposing insulated surface 29 extending over the greater portion of the area in contact with particle bed 27. Conductive current collector surfaces 30 and 31 are contiguous with respective insulated surfaces 29 of electrodes 23 and 24 and make conductive contact with respective particle beds 27 at their edge or rim portions.

Rim or edge current collection for certain electrochemical systems and electrode structures offers advantageous features compared with the surface collection of current shown in FIG. 1 where the entire face of current collector 14 is in contact with the rotating particle bed. In such systems, full surface contact may result in excessive deposition of electrodeposited material on the center portions of electrodeposited material on the center portions of the current collectors.

As shown in FIG. 5, rotating electrodes 23 and 24 are fixedly attached to a conductive rotating shaft 32, which is insulated from electrode 24 and counterelectrodes 33 and 34 by a coaxial insulating cylinder 35. A current lead connection 36 is made to counterelectrode 34, whereas counterelectrode 33 makes conductive contact with edge current collector 31. During operation of the battery, the particle bed electrodes 23 and 24 will be rotated together as a single unit, with counterelectrode 34 remaining in fixed position. A current lead 37 makes electrical contact with conductive shaft 32 which is also in electrical contact with current collector 30 of rotating electrode 23. Since the two bipolar rotating electrodes are series-connected, conductive current collector 31 of rotating electrode 24 is electrically insulated from rotating shaft 32, which is also insulated from counterelectrode 34. In order to minimize internal short circuiting of the battery and resultant self-discharge, end disc portions 38, which are made of insulating material, are suitably extended so as to provide a barrier for flow of the electrolyte between rotating electrodes 23 and 24, thereby preventing short circuiting of the series-connected rotating electrodes.

The bipolar battery concept illustrated in FIGS. 4 and 5 may be suitably employed for a zinc-nickel oxide secondary battery, particularly where several series-connected rotating electrodes are used. Thus, the negative plates would consist of rotating particle bed zinc electrodes, and the positive plates would be nickel hydroxide electrodes. Except for the end electrodes, each bipolar electrode structure would effectively function as both a cathode and anode at the same time. Advantageously, such a series-connected bipolar battery may be constructed to provide a battery having a relatively high voltage. Thus if a zinc-nickel hydroxide couple is 1.5 volts, and 18 bipolar electrodes are built into a battery, a battery potential of 27 volts will be obtained. Also, internal resistance losses will be generally less for a bipolar battery since current does not have to flow out to the edge of each electrode as would be the case with parallel-connected electrodes.

Figure 7:
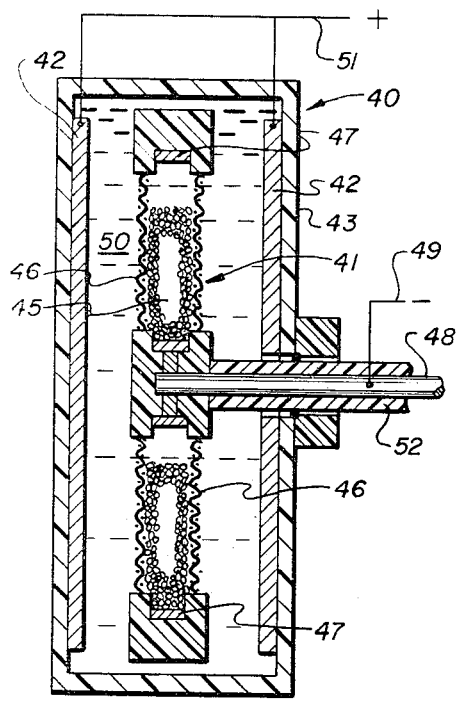
FIG. 7 is a cross-sectional view taken along the lines 7—7 of FIG. 5.
Figure 6:
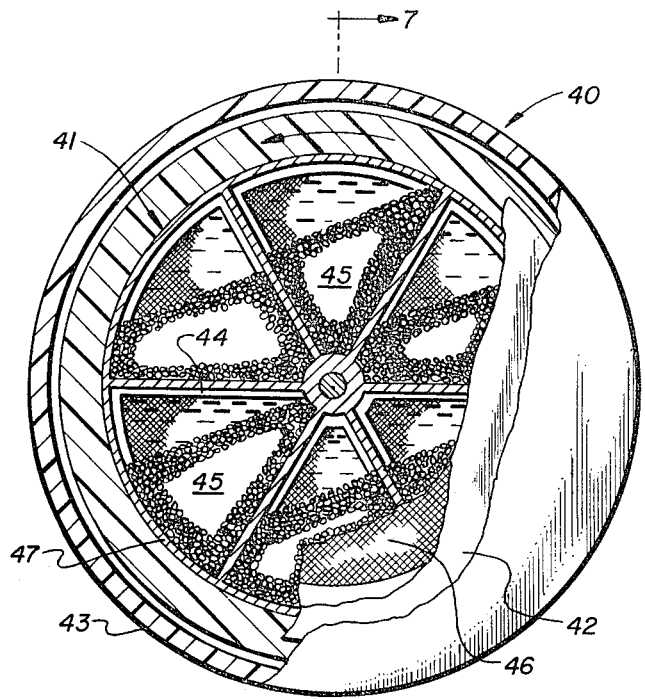
FIG. 6 is an elevational view, partly in section, of a cell utilizing a dual-faced electrode structure.

In FIG. 6 is shown a battery 40, illustratively a zinc-nickel oxide cell, FIG. 7 representing a cross-sectional view taken along the lines 7—7 of FIG. 6. In this cell a rotatable, dual-faced, multicompartmented zinc electrode 41 is utilized, with a pair of fixed parallel-connected counterelectrodes 42 spaced therefrom in opposing relationship. The cell container or casing 43 is made of a suitable insulating material, such as polystyrene. The zinc electrode 41 is divided into six compartments by the use of conductive metallic ribs 44 therein, such as cadmium-plated copper ribs. At the start of the charge cycle, each of the compartments is about half full of particle beds 45 consisting of zinc-plated steel balls of about 1 mm. in diameter. Porous insulated separators 46 are disposed on both faces of the dual-faced zinc electrode 41 and serve to retain the particle beds 45 within the electrode compartment. Because of the dual-faced electrode design, edge current collection is utilized. Conductive ribs 44 which divide the zinc electrode into its several compartments are connected to and form part of the conductive outer periphery 47 of rotating electrode 41. Conductive ribs 44 and conductive edges 47 make conductive contact with the rotating particle beds 45 as well as with a conductive shaft 48 to which is attached a current lead 49. Counterelectrodes 42, which comprise nickel oxide electrodes for a zinc-nickel oxide cell, are positioned in cooperative relation on both sides of the zinc electrode 41, both electrodes being immersed in a 35 wt. percent KOH electrolyte 50. Electrical interconnections are provided either internally or, as shown, external to the cell between the two nickel oxide electrodes 42. A current lead 51 is connected to counterelectrodes 42, which are suitably insulated from conductive shaft 48 by use of a concentric plastic cylinder 52 disposed about the conductive shaft 48.

The use of rotating dual-faced zinc electrodes increases both the energy capacity and power obtainable from the cell and at the same time avoids certain mechanical difficulties by permitting the construction of thicker electrodes than would be feasible if charge or discharge were restricted to only one face. While only a single dual-faced electrode has been illustrated in FIGS. 6 and 7, a number of such electrodes may be assembled to rotate on a single shaft, with suitable series or parallel interconnections, thereby utilizing a single drive means.

Figure 9:
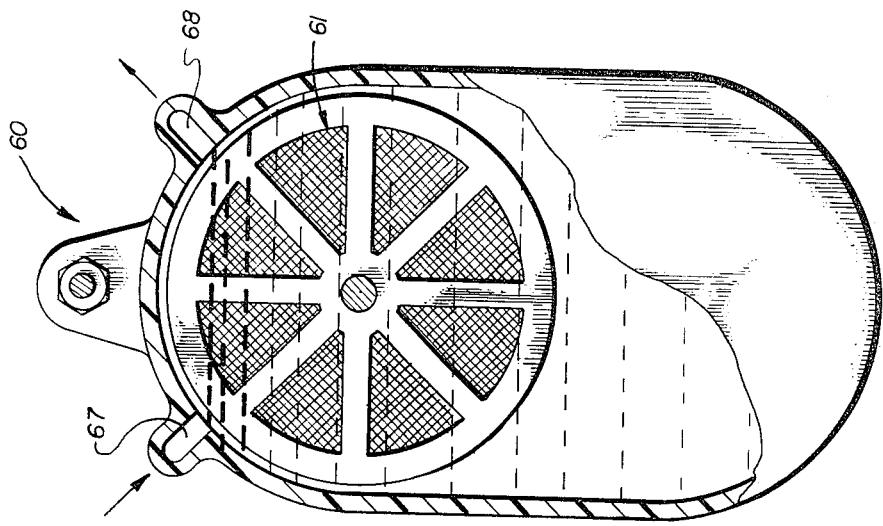
FIG. 9 is a cross-sectional view taken along the lines 9—9 of FIG. 8.
Figure 8:
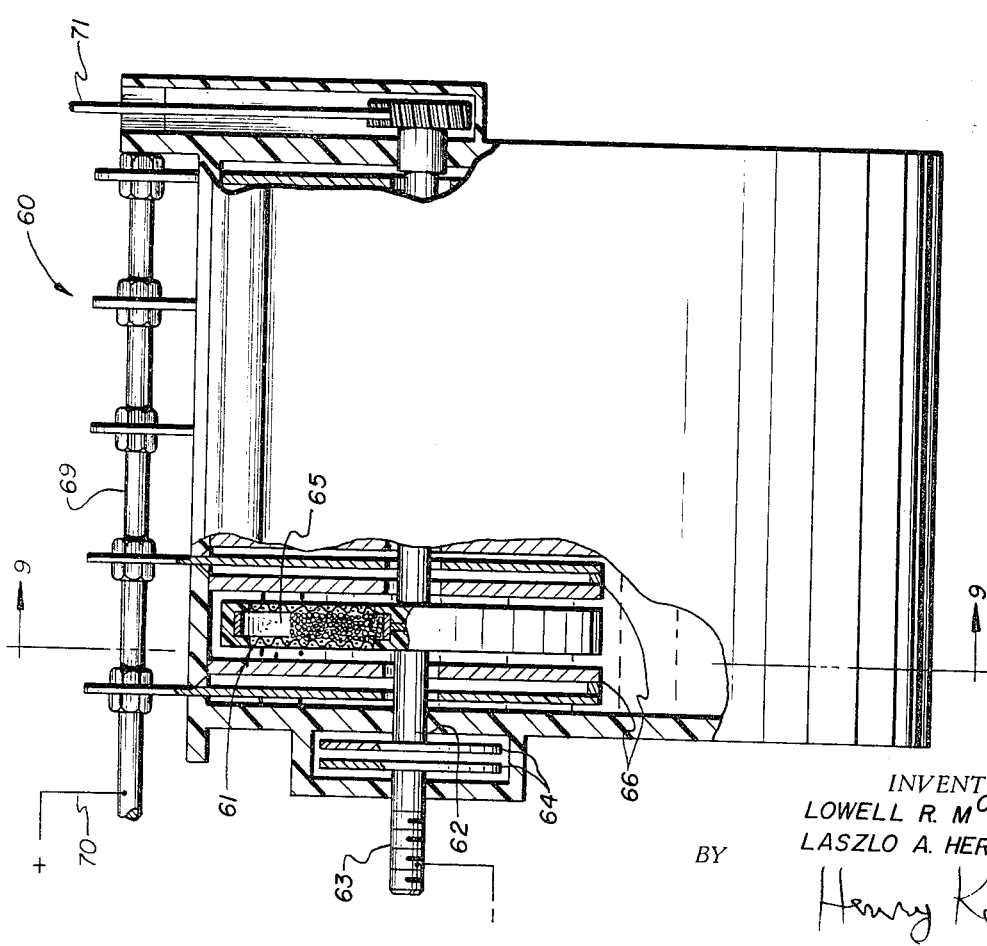
FIG. 8 is an elevational view, partly in section, of a zinc-air secondary battery utilizing five dual-faced zinc electrodes in parallel connection.

A zinc-air battery 60 is shown in FIGS. 8 and 9, in which five dual-faced rotating zinc electrodes 61 are connected in parallel configuration, each said electrode being electrically connected to a rotatable conductive shaft 62 which serves as the current connection for the zinc electrodes. A current terminal connection 63 is made to shaft 62 by use of mercury-wetted contacts 64. The dual-faced electrodes 61 are essentially of the same construction as that shown for the multicompartmented dual-faced electrode 41 of FIG. 7, except that each rotating electrode 61 is divided into eight compartments. Each of these compartments is partially filled with a particle bed 65 consisting of cadmium-plated steel balls having an outer coating of zinc. The corresponding air electrodes 66 remain stationary when the zinc electrodes are rotated during cell operation. A gas inlet 67 to the cell 60 is used for the admission of air or oxygen to the catalytic air electrodes, the depleted air or oxygen leaving by way of an outlet 68 from the cell. The air electrodes 66 are also connected in parallel, each being electrically connected to a nonrotating conductive rod 69 to which is connected a current lead 70. During cell operation, power is transmitted from a motor (not shown) to a geared drive shaft 71 so as to rotate shaft 62 with the fixedly attached dual-faced rotating electrodes 61.

Figure 11:
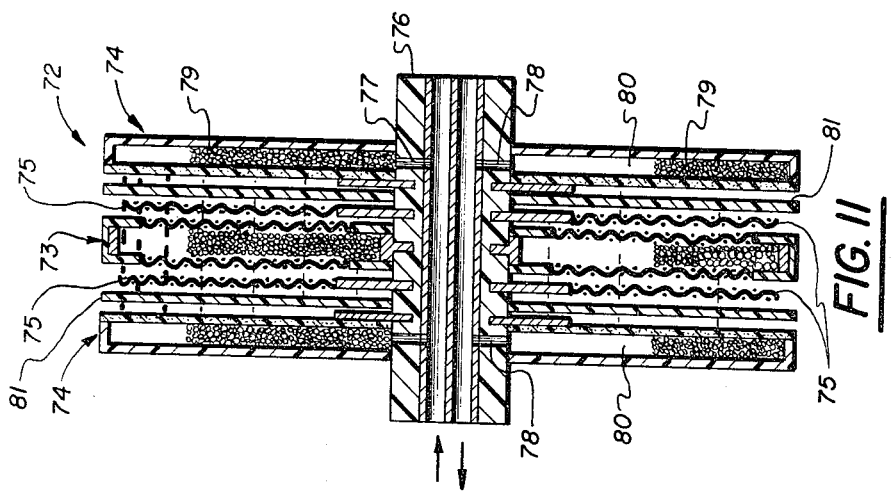
FIG. 11 is a cross-sectional view taken along the lines 11—11 of FIG. 10.
Figure 10:
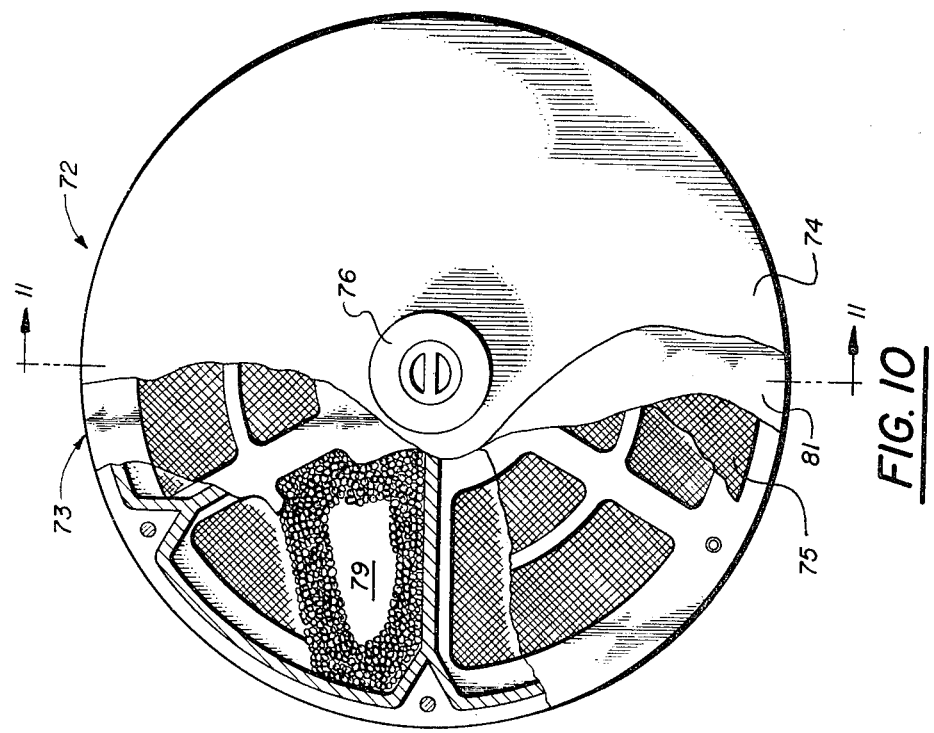
FIG. 10 is an elevational view, partly in section, of a zinc-air secondary battery in which both the zinc and air electrodes comprise electrically conductive particulate beds.

In FIGS. 10 and 11 are shown views of a zinc-air cell 72 in which a dual-faced zinc electrode 73, air electrodes 74, and charging electrodes 75 are fixedly attached to an insulated common shaft 76, electrodes 73, 74, and 75 being rotatable therewith. Insulated shaft 76 is of hollow construction and is divided to provide flow of air to air electrode 74 by way of a conduit 77. Oxygen-depleted air is removed by way of a conduit 78. The zinc electrode 73 is essentially of the same construction as that described for the dual-faced zinc electrode 41 of FIG. 7 and each of the compartments into which it is subdivided contains a conductive particle bed 79 which preferably consists of cadmium-plated steel balls approximately 1 to 2 mm. in diameter. These become coated with a layer of zinc during the charging cycle of the cell. The rotatable air electrodes 74 may be constructed to utilize conventional porous air electrode materials, or optionally, as shown, may contain a bed of conductive particles 80 which consist of spheres of 1 to 2 mm. in diameter of catalytic material, suitably finely divided carbon black, silver, or platinum particles of high porosity, which are formed into spheres of desired shape by being bonded with a plastic binder. Thus a mass of finely divided silver powder may be agitated in a polymer emulsion and then formed into cohesive particles and screened to obtain conductive particles of desired size, the plastic material serving only as a cohesive binder. Thereby when the air electrode is rotated, the turbulence provided by the particles in contact with the air-electrolyte mixture provides for effective transport of oxygen to the catalytic reaction sites.

Again referring to FIG. 11, it should be noted that the rotating particles employed in the air or oxygen electrode chambers 74, unlike those used in the rotating zinc electrode 73, do not change in size as the cell or battery is alternately charged and discharged. The particles in the air electrode may therefore fill the chamber to an extent limited only by the requirement that sufficient free volume remain therein to provide unhindered movement of the particles. These particles serve only to provide a suitable electrically conductive catalytic surface at which oxygen is consumed or evolved. Where the catalytic surface contains carbon or silver, the particles may undergo irreversible damage when functioning as an anode during recharge of the zinc electrode. To avoid such damage, electrochemically inert charging electrodes 75 are interposed between air electrodes 74 and zinc electrode 73 to serve as an anode during the recharge. A porous insulating barrier 81 is placed between charging electrodes 75 and air electrodes 74 to avoid electrical contact between these electrodes. The air electrode would serve thus only as the cathode during discharge of the zinc-air battery. Where the air electrode particles are not damaged during charging, auxiliary electrodes 80 may be omitted.

For simplicity of illustration of the cells shown in FIGS. 10 and 11, the current-carrying connection made to the various electrodes have not been shown. Conveniently and preferably, such electrical connections to electrodes 73, 74 and 75 are located in the insulating layer or coating around shaft 76 and serve to connect in parallel the two air electrodes 74 with each other in the cell. Where the cell is part of a battery, electrodes of the different cells can be connected in parallel or in series as required, using electrode connections located in the insulating part of shaft 76.

While a zinc-air cell with both the zinc and air electrodes being rotating particle-bed electrodes has been shown in FIGS. 10 and 11, a similar type of zinc-nickel oxide cell may be constructed where both the zinc and nickel oxide electrodes are rotating particle bed electrodes. For such a zinc-nickel oxide cell, charging electrodes 75 and air conduits 77 and 78 are not required.

The means required to rotate the rotatable electrodes may be obtained from a variety of sources; conveniently a small suitably geared low-speed electric motor which is directly connected to the drive shaft on which the rotatable electrodes are attached may be used. Typically, for a cell output of about 10 watts, the power consumption for rotating the electrodes was found to be less than 0.10 watt, i.e., less than 1 percent of the cell output. Under optimized conditions where frictional resistance of bearings and seals is minimal, the power consumption ordinarily should be less than 0.5 percent.

The power required to drive the electric motor may be conveniently obtained from the output of the cell itself. Where it is desired to use an alternating current motor to drive the cell, or where it is desired to obtain alternating current directly from a zinc-counterelectrode battery so as to make feasible the direct use of alternating current motors and similar electrical devices, then various arrangements may be utilized for this purpose.

Basically, the requirement for a low-friction current tap from a rotating shaft, as is present in the batteries of the present invention, is related to the problem of removing current from a mechanical generator of either the alternating-current or direct-current type. Thus, a current take-off may be made up of insulated segments like the commutator of a direct current generator, with alternate segments connected to the positive and negative poles of the cell or battery. Sets of brushes are then arranged so as to make contact with either one or more positive segments or one or more negative segments, but not with both positive and negative segments at the same time. Then as the segments are rotated, each brush would contact first the positive poles and then the negative poles, and thereby tap off alternating current. For a rotational speed of 15 rpm, using 60 segments per quadrant, 60-cycle alternating current would be obtained.

In FIGS. 12–14 are shown perspective, cross-sectional and disassembled plan views, respectively, of a suitable current tap-off arrangement in which both alternating current and direct current are obtainable from the same electric cell. For simplicity of representation, the segments shown per quadrant are exemplary only, and not intended to be related to a specific cycle frequency. The current-tap arrangement is illustrated by a commutator-like device 82 which consists of a conductive cylinder section 83 which is concentrically disposed in engaging relationship with a conductive drum section 84. The conductive cylinder section 83 is made up of an insulated inner cylinder 85 and a plurality of conductive finger sections 86. Inner cylinder 85 consists of a conductive central shaft 87, covered by an insulating layer 88 which insulates shaft 87 from hub 89 of drum section 84, through which it passes. The conductive finger sections 86 are receivable in grooves 90 of the conductive drum section 84 and suitably insulated therefrom by insulating segments 91. Both the drum section 84 and the cylinder section 83 would be rotatable together as part of a unitary rotating assembly conductively attached to the respective electrodes of the electric cell by suitable current connections (not shown).

Illustratively, the central shaft 87 of cylinder section 83 would be electrically connected to the zinc anode of a zinc-nickel oxide cell, and the drum section 84 would be electrically connected to the nickel oxide cathode. Thus during the discharge cycle of the cell, alternate series of negative and positive contacts provided by fingers 86 and ridges 92, respectively, between the grooves 90 of drum section 84 would be located on the same rotating assembly. Two sets of brushes are then utilized for obtaining direct current and alternating current from the rotating assembly. As shown in FIG. 12, brushes 93 and 94 provide a direct current take-off and brushes 95 and 96 provide an alternating current take-off. Since brushes 95 and 96 must not make simultaneous contact with both the negative and positive rings during cell operation, their contacting width must of course be less than the width of the insulating segments 91 so as to thereby provide nonshorting contact when moving from a positive contact to a negative contact.

The following examples, which are illustrative only and are not to be construed as limiting the invention, describe the operation of rotating particle bed electrode structures and of electrochemically reversible zinc-nickel oxide and zinc-air cells containing such rotatable electrode structures.

EXAMPLE 1

Rotating Particle Bed Zinc Electrode

An electric cell was made having a flowing particle bed zinc electrode structure similar to that illustrated in FIGS. 1 and 2, together with a fixed inert counterelectrode. This latter electrode consisted of a 15 × 15 cm. sheet of platinum-catalyzed air electrode material in the form of platinum black bonded to a gold-plated 80-mesh nickel screen with a plastic binder. This air counterelectrode was not supplied with air or oxygen but merely constituted a surface for an electrode process providing hydrogen or oxygen evolution. The diameter of the zinc electrode compartment was 15.2 cm., its depth was 0.63 cm., and the cross-sectional area was about 180 $cm^2$. Small cadmium-plated steel balls (1–2 mm. in diameter) were used as seed spheres upon which to deposit the zinc. The zinc electrode compartment was filled to more than one half its volume with these zinc-coated steel balls after charging. A cadmium-plated metal screen was used as current collector. The insulated separator used for retaining the spheres in the electrode compartment was a 35-mesh plastic screen or polytetrafluoroethylene polymer which was reinforced by a wheel-shaped plastic structure. The cell casing and the plastic reinforcing structure were made of polystyrene. Generally ethylene-propylene rubber was found suitable for the sealing gaskets. A copper shaft connected to the current collector was utilized as the zinc electrode lead. The electrode was rotated by means of a small low-speed motor connected to the shaft.

In a typical run, the rotating electrode compartment was about one-third filled with cadmium-plated steel balls (1.0–2.0 mm. in diameter, 150–180 g). The cell cavity was filled with a slurry of about 4 wt. percent zinc oxide in approximately 450 ml. of 38 wt. percent potassium hydroxide, thereby saturating the electrolyte with zincate ion. A preliminary charge of about one-half hour's duration at 9 amps was used to apply an initial zinc coating to the balls. The cell was then connected to a power supply through a timer switch and relay to provide the charge-discharge cycling of the desired time sequence and current density.

In cycling tests made using this flowing particle bed zinc electrode, it was found possible to "charge" and "discharge" the rotating electrode repeatedly at rates up to 100 ma./$cm^2$ based on the cross-sectional area of the rotating electrode. Conventional zinc electrodes ordinarily do not withstand charge rates in excess of 20 ma./$cm^2$ on repeated cycling without rapid failure by dendritic shorting.

The zinc coating formed on the cadmium-plated steel balls was a smooth one, in part of the rolling action of these particles, and had a density about 70 percent of the value of 7.14 g./$cm^2$ for bulk zinc. Further improvement in density was obtained by the addition of small amounts of cadmium oxide or cadmium hydroxide to the potassium hydroxide electrolyte. Thus any traces of the substrate cadmium metal coating of the steel balls which enter the electrolyte after complete discharge of the zinc coating effectively help rather than interfere with zinc redeposition.

EXAMPLE 2

Repeated Cycle Runs

The performance of the zinc electrode was evaluated by repeated cycling in a cell essentially similar to that described under Example 1 except that the current collector structure was modified to provide rim-and-spoke current collection as described in Table 1, in which are also shown the results obtained for 4-hour cycling runs.

TABLE 1
Zinc electrode cycling: 4-hour cycles

A. Data on electrode structure and testing procedure:
- Cycle periods: 2.0 hr. charging, 2.0 hr. discharging.
- Current collector: Wheel-shaped copper sheet, cadmium-plated.
- Electrode seed particles: 1.0 mm. average diameter steel shot, cadmium-plated; weight—120 gm.
- Electrode compartment: 15.2 cm. diameter, 0.48 cm. depth; 30% volume filled with steel balls at full discharge; 50% of volume filled with zinc coated steel balls at full charge.
- Total weight of zinc: 50 gm.~42 amp-hr. (at full charge).
- KOH concentration: 38 wt. percent.
- Depth of discharge (at 13.4 amp current): 64%.

B. Testing results:
- Total number of cycles: 290.
- Cycling test at various current densities.
  - 25 cycles at 56 ma./cm.² (10 amp).
  - 25 cycles at 67 ma./cm.² (12 amp).
  - 58 cycles at 83.5 ma./cm.² (15 amp).
  - 182 cycles at 75 ma./cm.² (13.4 amp).
- Visual inspection of electrode particles after 120 and 210 cycles showed no significant change from initial condition.
- Highest sustained charge rate: 100 ma./cm.² (18 amp) for 2.0 hr.
- Highest sustained discharge rate: 100 ma./cm.² (18 amp) for 2.0 hr.

EXAMPLE 3

Zinc-Nickel Oxide Cells

Zinc-nickel oxide cells of the type illustrated in FIGS. 1 and 2 were used having a single-faced, single-compartment zinc electrode with a cadmium-plated copper disc as current collector. The counterelectrode structure 16 consisted of stationary nickel oxide electrodes of the type used in commercial nickel-cadmium cells wherein the active material is contained in a porous, sintered nickel-matrix surface. Several portions of such nickel oxide electrodes were joined to obtain a single electrode with an area of approximately 230 cm². These nickel oxide electrodes limited the capacity of the cell to about 14 amp hours.

Results of a typical run are summarized in Table 2.

TABLE 2
Zinc-nickel oxide cells

A. Cell construction:
- Zinc electrode:
  - Dimensions: 15.2 cm. diameter, 0.64 cm. deep.
  - Rotational speed: 23 r.p.m.
  - Power consumed by rotating electrode: 0.07 to 0.12 watts.
  - Seed particles: 150 g. of cadmium-plated steel balls, 1.5 to 2.0 mm. diameter.
  - Zinc load: Up to 80 g.
- Nickel electrode: Rectangular plates, 15.2 x 15.2 x 0.36 cm.
- Electrolyte: 38 wt. percent KOH plus zinc oxide.

B. Operating conditions:
- Cycle period: 1.5 hr. charge, 1.5 hr. discharge.
- Current density: 50 ma./cm.², projected area.
- Temperature: Approximately 30° C.
- Performance-limiting component: Nickel oxide electrode (~14 amp-hr. capacity).
- Average cell voltage: 1.35 v. on discharging, 2.20 v. on charging.
- Average cell output: 12 watts.

EXAMPLE 4

Single-Faced Compartmented Zinc Electrode

A zinc-nickel oxide cell having a single-faced, six-compartment zinc electrode using an edge- or rim-type current collector was used. This cell corresponds to that illustrated in FIGS. 6 and 7 modified to have only a single-faced zinc electrode. Thus left-side porous insulated separator 46 is replaced by a solid separator, and corresponding facing counterelectrode 42 is eliminated.

Results of a typical repeated-cycle run are summarized in Table 3.

TABLE 3
Cycle tests: Zinc-nickel oxide cell

A. Cell construction:
- Zinc electrode:
  - Dimensions: 15.2 cm. diameter, 0.64 cm. deep.
  - Rotational speed: 23 r.p.m.
  - Current collector: Cadmium-plated copper strips dividing electrode into six compartments of equal area.
  - Seed particles: Cadmium-plated steel balls, 1.5 to 2.0 mm. diameter, 30 g. of balls per compartment.
  - Electrolyte: 38% KOH plus zinc oxide.
- Nickel electrode: Sintered porous nickel matrix surface, 14.6 x 11.1 x 0.24 cm.

B. Operating conditions: Regime I: 43 cycles.
Discharge was continued until nickel oxide electrode was completely discharged. Current and voltage are the average values for the period. Charged at constant current; voltage is the average value for the period.
- Charge: 35 min., 9 amps (50 ma./cm.² of area of zinc electrode) 2.3 volts.
- Discharge: 14 amps at 0.9 volts.
- Regime II: 371 cycles.
- Charge: 35 min., 8.3 amps, 2.3 v.
- Discharge: 7.5 amps at 1.3 v.
- Total: 414 cycles.

EXAMPLE 5

Zinc-Nickel Oxide Cell with Dual-Faced Zinc Electrode

A zinc-nickel oxide cell of the type shown in FIGS. 6 and 7 was used. The diameter of the compartmented dual-faced zinc electrode 41 was 15.2 cm. The zinc electrode was rotated by means of conductive shaft 48, and was faced on both sides by stationary nickel oxide electrodes 42. The plastic cell case 43 was filled with 35 wt. percent KOH containing ZnO. The two nickel oxide electrodes were connected in parallel to the positive cell terminal 51; the negative cell terminal 49 was connected through a brush-type current take-off to the conductive shaft. The following typical performance data were obtained during cycling runs with this cell:

| Operating Mode | Current (amps) | Current Density (ma/cm²) | Cell Voltage (volts) | Cell Output (watts) |
| --- | --- | --- | --- | --- |
| Charging | 5 | 14 | 1.95 | |
| | 10 | 28 | 2.06 | |
| | 15 | 42 | 2.15 | |
| | 18 | 50 | 2.21 | |
| | 25 | 70 | 2.36 | |
| Discharging | 0 | 0 | 1.75 | 0 |
| | 8.3 | 23 | 1.58 | 13.1 |
| | 16.1 | 45 | 1.43 | 23.0 |
| | 23.8 | 66 | 1.30 | 31.0 |
| | 31.7 | 88 | 1.18 | 37.4 |
| | 36.4 | 101 | 1.12 | 40.7 |

EXAMPLE 6

Zinc-Nickel Oxide Cell with Dual-Faced Zinc Electrode and Rotatable Counterelectrode A unitary zinc-nickel oxide cell having a dual-faced zinc electrode divided into six compartments was used. This cell was a modification of the general type illustrated in FIGS. 10 and 11, which uses peripheral or rim current collection for the rotatable flowing particle bed zinc electrode and also has rotatable counterelectrodes. However, in this modified cell counterelectrode 74 consisted of a rotatable conventional nickel oxide pocket-type electrode wherein the active material is retained between pairs of finely perforated nickel sheets. Since a nickel oxide pocket-type counterelectrode was used, the cell construction corresponding to that illustrated in FIG. 11 was further modified so that shaft 76 contained no conduits for air flow, and charging electrodes 75 were eliminated. The diameter of each electrode was about 15.2 cm.

Both the flowing particle bed zinc electrode and the nickel oxide electrodes were rotated as a unit in a slurry of zinc hydroxide and 35 wt. percent KOH. At rest, the zinc oxide settles to the bottom of the cell. During operation the oxide is suspended in the alkaline electrode. Rotation was maintained during charge and discharge by a small 2-volt direct-current motor suitably geared to the cell. In cycling tests the following results were obtained.

| Operating Mode | Current (amps) | Cell Voltage (volts) | Cell Output (watts) |
| --- | --- | --- | --- |
| Charging | 5.0 | 2.07 | |
| | 8.0 | 2.14 | |
| | 10.0 | 2.20 | |
| Discharging | 5.0 | 1.5 | 7.5 |
| | 10.0 | 1.3 | 13.0 |
| | 18.0 | 1.1 | 19.8 |

EXAMPLE 7

Zinc-Air Cell

A zinc-air cell with aqueous potassium hydroxide electrolyte was used of the type illustrated in FIGS. 1 and 2, the stationary counterelectrode 16 consisting of submersible platinum-catalyzed air electrodes of the kind described in Example 2, but supplied with a steady stream of air or oxygen. Typical performance data for both the charge and discharge modes are shown in Table 4, oxygen being supplied to the air electrode during cell discharge, a maximum power output of 10 watts resulted:

TABLE 4

Zinc-Air Cell Operating Data

| | Cell Voltage (v) | Current Density (ma/cm$^2$) |
| --- | --- | --- |
| Open Circuit | 1.43 | — |
| Discharging | 1.28 | 10 |
| | 1.19 | 20 |
| | 1.10 | 30 |
| | 1.03 | 40 |
| | 0.96 | 50 |
| | 0.82 | 70 |
| Charging | 1.95 | 10 |
| | 2.03 | 20 |
| | 2.10 | 30 |
| | 2.16 | 40 |
| | 2.22 | 50 |
| | 2.28 | 60 |

In other runs using these conventional-type submersible platinum-catalyzed air electrodes, the zinc-air cell could be operated at power outputs as high as 12 watts using oxygen and about 8 watts when supplied with air.

While the flowing particle bed electrode structure of this invention is preferably utilized for electrically regenerable zinc-nickel oxide or zinc-air batteries, it may also be employed advantageously in other batteries and also for many other electrochemical applications. For example, where the zinc electrode is used as the negative electrode in a cell or battery, positive counterelectrodes that are more electropositive than zinc may be used in place of nickel oxide or oxygen, e.g., silver oxide, manganese dioxide, and mercuric oxide. Conversely, batteries may be made using any of these positive electrodes wherein other anode materials may be utilized in place of zinc for the flowing particle-bed rotatable electrode. It is only necessary that the anode material selected by electrochemically reactive, compatible with the electrolyte, and more electronegative than the counterelectrode used. Such materials include lead, tin, iron and cadmium for use in aqueous electrolytes, and aluminum and magnesium for use in nonaqueous electrolyte systems. From the standpoint of cost, capacity, and convenience, zinc is the preferred material for the negative electrode, and the improved battery of this invention has been described therefore with reference to use of a rotatable zinc anode structure, particularly in conjunction with nickel oxide and with air counterelectrodes.

The described cells will operate with conventional electrolytes, which include the alkaline materials such as sodium hydroxide, potassium hydroxide, mixtures of potassium and rubidium hydroxides, and the like. For certain applications, depending upon the nature of the electrode and counterelectrode materials, acid electrolyte including sulfuric and phosphoric acids, can also be employed.

The flowing particle-bed electrode may also be utilized in the electrowinning of metals, that is, producing metals by electrodeposition. The cathode would consist of the rotating particle beds. The anode would consist of the crude metals being refined, e.g., Au, Ag, Cu. The crude metal anode goes into solution, and the pure metal therefrom is deposited on the cathode particles.

Where the flowing particle bed electrode is used in the electrowinning or electrorefining of metals, the particles will vary in size during operation. For example, in the electrorefining of copper, the substrate conductive particles may be of steel, and then the purified copper deposited would be successively stripped from these substrate particles. However, where it would be preferable to obtain the purified metal in the form of spheres of a given size, then particles of the desired metal would be used as nuclei for the metal deposition; when the spheres had grown to desired size, these would be removed from the system and new particles added thereto to serve as nuclei for subsequent deposition.

Oxidation or reduction reactions may also be conveniently conducted with a flowing particle bed rotating electrode structure where the product of the reaction does not alter the size of the conductive particles in the rotating mass. Thus, mercury could be introduced into the rotating container by some convenient means, e.g., through the shaft, whereby the mercury would coat the conductive particles, e.g., steel spheres. Sodium metal could then be electrodeposited from brine into the mercury film. The sodium-containing mercury (amalgam) draining from the rotating electrode could then be used for the recovery of the sodium metal in a similar cell using molten salt or other non-aqueous electrolytes, including aprotic solvents such as propylene carbonate, dimethyl formamide, butyrolactone, dimethyl sulfoxide, and the like. Or the amalgam could be transported to a similar cell where the sodium metal content could then be electrochemically oxidized to the sodium ion to form sodium hydroxide solution. The large surface area and agitation provided by the rotating electrode would offer minimum polarization losses and high rates of amalgam production within a small compact cell. As the size of the conductive particles is unaffected by the course of the reaction, the rotating container would be initially filled to the maximum volume permitting free motion of the particles. Depending on the other parameters, a fractional volume such as two-thirds to three-fourths would be used.

In this electrode system using mercury there is only a surface coating of the amalgam on the underlying conductive particles, with the amalgam coating forming a sodium-containing layer on these particles. In addition to Na, the metals Li, K, Ca, or Mg may be used. For such applications, the particles may consist of any conductive materials not attacked by the particular amalgam or electrolyte used. Thus, steel particles would be useful in conjunction with the amalgam system. Or ceramic, glass or quartz particles provided with a suitably adherent conductive metal coating may be used.

The above examples describe electrochemical processes involving inorganic elements, ions or gases in auqeous or non-aqueous electrolytes. The rotating particle bed electrode structure may also be advantageously employed in the oxidation or reduction of organic compounds. For example, the reduction of nitrobenzene-sulfonic acid to metanilic acid in aqueous sulfuric acid using fluidized beds of copper-plated plastic spheres has been reported by J. B. Backhurst et al. in *J.*

*Electrochem. Soc.* 116, 1600 (1969). Since fluidized electrodes involve intermittent contact between the particles and the current collector, a high internal cell resistance occurs, which limits the utilizable current density. The substantially constant contact existing between the conductive particles and the current collector in the rotating flowing particle-bed electrode would result in a lower cell resistance and thereby permit this electrochemical reduction to be performed at higher current densities.

The flowing particle bed electrode structure of this invention may also be used in the electrochemical demineralization of saline or brackish water. Previously studied electrochemical demineralization methods have employed a variety of fixed electrode structures. Currents obtainable, and hence demineralization rates, have been low, and electrodes have been expensive to fabricate. By utilizing a rotating particle bed electrode, the entire electrode demineralization process may be considerably improved by providing higher current density and consequently higher throughput rates. Also, electrode fabrication costs become minimal since there is no requirement for forming the active electrode materials into a rigid structure of adequate strength. While the flowing particle bed used in the demineralization is electrically conductive, this may be accomplished without all of the particles constituting the bed being electrically conductive. Small fully graphitized spherical carbon particles could be used which would be prior treated to develop appropriate anionic and cationic response characteristics; or a conductive particle bed could constitute a mixture of the conductive particles with spherical beads of the appropriate ion-exchange resins for use in the anode and cathode compartments.

The rotating electrode structure of the present invention provides a large conductive surface area relative to a given volume together with a high degree of agitation at the electrode-electrolyte interface. This is achieved by use of a conductive flowing particle bed containing electrically conductive particles moving freely within the confines of a rotating container whose axial dimension is small relative to the circumscribed outer diameter. In order to obtain an optimized electrode design and achieve optimum electrical performance under conditions of repeated discharge and charge cycles, many varying cell parameters must be suitably interrelated. The selection of specific parameters will be readily apparent to those skilled in this art or may be conveniently determined by routine experimentation within the scope of the teaching herein. Thus the conductive moving mass of particles in the rotating electrode is deliberately chosen to insure large surface area and maximum mobility; this may be achieved within a wide framework of substrate and overall particle sizes, shape of the particles, number of compartments within a single cell structure, relative volume of particles partially filling the compartment space, speed of rotation of the electrode structure, and the like. Thus while ordinarily the conductive particles are essentially spherical in shape and preferably of about 1 to 5 millimeters in diameter, this may be varied within wide limits. For certain applications it may be desirable to use particles that are ovate or gibbous shaped or that have a greater degree of flatness such as scutiform or discoid shaped particles. Also, while the total real surface area of a spherical particle increases linearly as its diameter decreases, where the diameter of the particles approaches 0.1 mm., they tend to become too readily fluidized even at low rotational speeds. With such small particles, a suitably conductive flowing particle bed is not obtained, inadequate electrical contact between the individual particles themselves and the current collector resulting in increased internal cell resistance.

While the electrode volume is conveniently and preferably divided into a plurality of compartments, e.g., from three to 12 compartments, it is apparent that other than wedge or pie shaped compartments may be formed, as obtained with use of radial or spoke-like members illustrated in FIGS. 3, 6, and 7. Thus the rotating electrode may consist of various shaped compartments, e.g., circular, elliptical, polygonal, formed by radially or concentrically disposed dividing members, which generally will also serve as current collectors. Thus no requirement for a particular compartment configuration is intended. It is essential only that the conductive particles contained in the compartments can readily form electrically conductive flowing particle beds and that the compartments provide means for making effective electrical contact with these flowing particle beds.

Where the electrochemical reaction which occurs does not involve deposition of a metal on the particulate bodies, as in a rotating particle bed air or nickel oxide electrode, neither the container for the particles nor the porous separator need be insulated from the contained flowing particle bed. Also, where not so insulated, the container or separator may be utilized for current collection from the cell.

The construction of the current collector, whether in the form of a solid plate or strip or in perforate form, and the type of metal of which it is made as well as its surface coating, will depend in part on whether it serves solely as a current-collecting source or whether metallic electrodeposition can occur on its surface during cell operation. Also, while the current take-off has not been shown other than schematically in the drawings, this may be any conventional means accessible by connection through the casing. Such means will be readily apparent to those skilled in the art. It will thus be readily apparent that within the scope and spirit of the present invention, it may be practiced otherwise than as specifically illustrated and described herein.

We claim:

1. An electrode structure for use with an electrolyte in an electrochemical system, said electrode structure comprising, in combination, containing means permeable to the electrolyte and having at least one compartment therein, said containing means comprising a rotatable shallow cylindrical container having a pair of opposing faces and at least one compartment therein partially filled with a reusable electrically conductive bed forming an integral part of said electrode structure, said bed consisting essentially of substantially spherical conductive particles not less than 0.1 millimeter in diameter and with a maximum diameter less than the axial length of the container, the first opposing face of said container comprising an electrolyte-permeable porous separator having a pore size smaller than those of the particles for retaining said reusable electrically conductive bed of particles in the compartment at least during electrochemical operation of said electrode structure, means for rotating said container to move said bed to provide an electrically conductive flowing particle bed stream within said compartment establishing a plurality of electro-chemical reaction sites at the interface of the particulate bodies and the electrolyte, and current-collecting means comprising a conductive surface in electrical contact with at least a major portion of said bed for collecting current therefrom.

2. An electrode structure according to claim 1 wherein said current-collecting means includes at least the second opposing face of said container as said conductive surface in electrical contact with at least a major portion of said bed for collecting current therefrom.

3. An electrode structure according to claim 2 wherein said shallow cylindrical container has a substantially circular cross section and a ratio of outer diameter to axial length greater than 10:1, said container being divided into a plurality of compartments partially filled with said conductive particles.

4. An electrode structure according to claim 3 wherein said ratio of outer diameter to axial length is between 20:1 and 200:1.

5. An electrode structure according to claim 2 wherein said second opposing face comprises a porous conductive surface.

6. An electrode structure according to claim 1 wherein said shallow cylindrical container is insulated, both faces of said container comprise electrolyte-permeable porous insulated separators having a pore size smaller than those of the particles for retaining said particles in the compartment, the current-collecting means in electrical contact with at least a major portion of the electrically conductive flowing particle bed includes a peripherally disposed conductive surface.

7. An electrode structure according to claim 6 wherein said container is divided into a plurality of compartments by conductive radial members which also serve as current collectors.

8. An electrode structure according to claim 7 wherein said insulated shallow cylindrical container has a substantially circular cross section and a ratio of outer diameter to axial length between 20:1 and 200:1, said container being divided by conductive radial members into from three to 12 compartments partially filled with substantially spherical conductive particles having a diameter between 1 and 3 millimeters and less than the axial length of the container, and an axially disposed shaft means is fixedly attached to said container for rotating it at a preselected speed to provide said electrically conductive flowing particle bed streams within said compartments.

9. An electrode structure according to claim 8 wherein said conductive particles have an outer coating of zinc over an underlying layer of cadmium.

* * * * *

PO-1050
(5/69)

UNITED STATES PATENT OFFICE
CERTIFICATE OF CORRECTION

Patent No. 3,663,298          Dated    May 16, 1972

Inventor(s) Lowell R. McCoy and Laszlo A. Herédy

It is certified that error appears in the above-identified patent and that said Letters Patent are hereby corrected as shown below:

Column 8, line 48, delete "of electrodeposited material"; line 49, delete "on the center portions".

Column 10, line 63, after "other" insert --and also to connect the two charging electrodes 75 with each other--.

Column 12, line 28, "or" should read --of--; line 55, after "part" insert --because--.

Column 15, line 12, delete "10.0" under "Charging" and insert --10.0-- under "Current"; line 69, "by" should read --be--.

Column 16, line 69, "auqeous" should read --aqueous--.

Column, 19, line 4, after "compartment," insert --and--.

Signed and sealed this 9th day of January 1973.

(SEAL)
Attest:

EDWARD M.FLETCHER,JR.          ROBERT GOTTSCHALK
Attesting Officer                 Commissioner of Patents